Dec. 15, 1970 H. L. THAL, JR., ET AL 3,548,246

BICONICAL LOG PERIODIC AMPLIFIER

Filed Sept. 29, 1966 4 Sheets-Sheet 1

INVENTORS:
HERBERT L. THAL, JR.
CHARLES B. MAYER,

BY James J. Lichiello

THEIR ATTORNEY.

Dec. 15, 1970 H. L. THAL, JR., ET AL 3,548,246

BICONICAL LOG PERIODIC AMPLIFIER

Filed Sept. 29, 1966 4 Sheets-Sheet 2

INVENTORS:
HERBERT L. THAL, JR.
CHARLES B. MAYER,

BY James J. Lichiello
THEIR ATTORNEY.

BICONICAL LOG PERIODIC AMPLIFIER

Filed Sept. 29, 1966

INVENTORS:
HERBERT L. THAL, JR.
CHARLES B. MAYER,
BY James J. Nicholls
THEIR ATTORNEY.

Dec. 15, 1970 H. L. THAL, JR., ET AL 3,548,246

BICONICAL LOG PERIODIC AMPLIFIER

Filed Sept. 29, 1966 4 Sheets-Sheet 4

INVENTORS:
HERBERT L. THAL, JR.
CHARLES B. MAYER,
BY James J. Lichiello
THEIR ATTORNEY.

United States Patent Office 3,548,246
Patented Dec. 15, 1970

3,548,246

BICONICAL LOG PERIODIC AMPLIFIER

Herbert L. Thal, Jr., Rotterdam, and Charles B. Mayer, Scotia, N.Y., assignors to General Electric Company, a corporation of New York Filed Sept. 29, 1966, Ser. No. 589,161
Int. Cl. H01j *25/12, 25/42;* H03j *3/54*
U.S. Cl. 315—3.5 20 Claims

ABSTRACT OF THE DISCLOSURE

A biconical log periodic device is disclosed which in one form is an R-F amplifier including a pair of interconnected conical slow wave circuits in apex abutting axial relationship defining an electron beam path therethrough. The slow wave circuits taper in a log periodic manner and an electron beam which passes therethrough is also complementarily tapered in a log periodic manner. An input signal is coupled into one of the circuits to selectively energize a region therein based on the input signal frequency, and the beam is modulated. This modulated beam passes into the other circuit to selectively energize a region therein and amplified power is transferred to the other circuit to be taken off as amplified power.

This invention relates to a log periodic electron discharge device and more particularly to a biconical log periodic electron beam device including interaction between an interaction structure having interaction characteristics varying progressively therealong in a log periodic manner and an electron beam passing therethrough, whose interaction characteristics vary progressively therealong in a log periodic manner. Optimum interaction takes place at selected regions along the interaction structure depending on the frequency characteristics of an input signal wave to provide, for example, a very high R-F power output over a wide frequency band.

Extensive efforts have been expended to increase the operating bandwidth of microwave or R-F tubes in general. Particularly, high power R-F tubes such as velocity and/or density modulated electron beam tubes, including klystrons and traveling wave tubes, are generally compromises between inherent bandwidth limitations and power output. For example, a multicavity velocity modulated electron beam klystron usually has a very high power output in a range of up to several megawatts but with a maximum relative bandwidth of only about 10%. On the other hand typical traveling wave tubes generally have lesser power output but increased bandwidth. Hybrid combinations of klystrons and traveling wave tubes may provide more bandwidth but with a sacrifice of other prime considerations such as output, uniformity, gain, et cetera. Due to the continuous development of more sophisticated electron apparatus, there is an increasing demand for example for a single tube type having both a uniform high power output and a wide frequency band. There has also been a demand for an amplifier tube whose input and output circuitry may be separately controlled in an independent manner so that greater flexibility of circuits may be employed.

Accordingly, it is an object of this invention to provide an improved log periodic electron discharge device.

It is another object of this invention to provide an improved combination of log periodic structures in an electron discharge device.

It is a further object of this invention to provide an improved log periodic amplifier device having separate input and output circuits.

It is still another object of this invention to provide at least a pair of cooperating physically independent log periodic circuits in a log periodic amplifier.

It is another object of this invention to provide an R-F amplifier including at least a pair of different, log periodic circuits joined as an input and output circuit respectively.

It is a yet further object of this invention to provide a pair of tapered log periodic circuits in apex to apex relationship.

It is yet another object of this invention to provide an R-F power amplifier including a pair of frustoconical log periodic circuits having a common apex.

Briefly described, this invention includes in one of its preferred forms a pair of frustoconical log periodic circuits of the traveling wave or coupled cavity type which are positioned in apex abutting axial relationship. An input signal is introduced into one of the log periodic circuits for interaction therein and an amplified signal is coupled out of the other circuit.

This invention will be more fully understood when taken in connection with the following description and drawings in which, FIG. 1 is an exemplary illustration of one preferred coupled cavity log periodic circuit;

Figure 1:
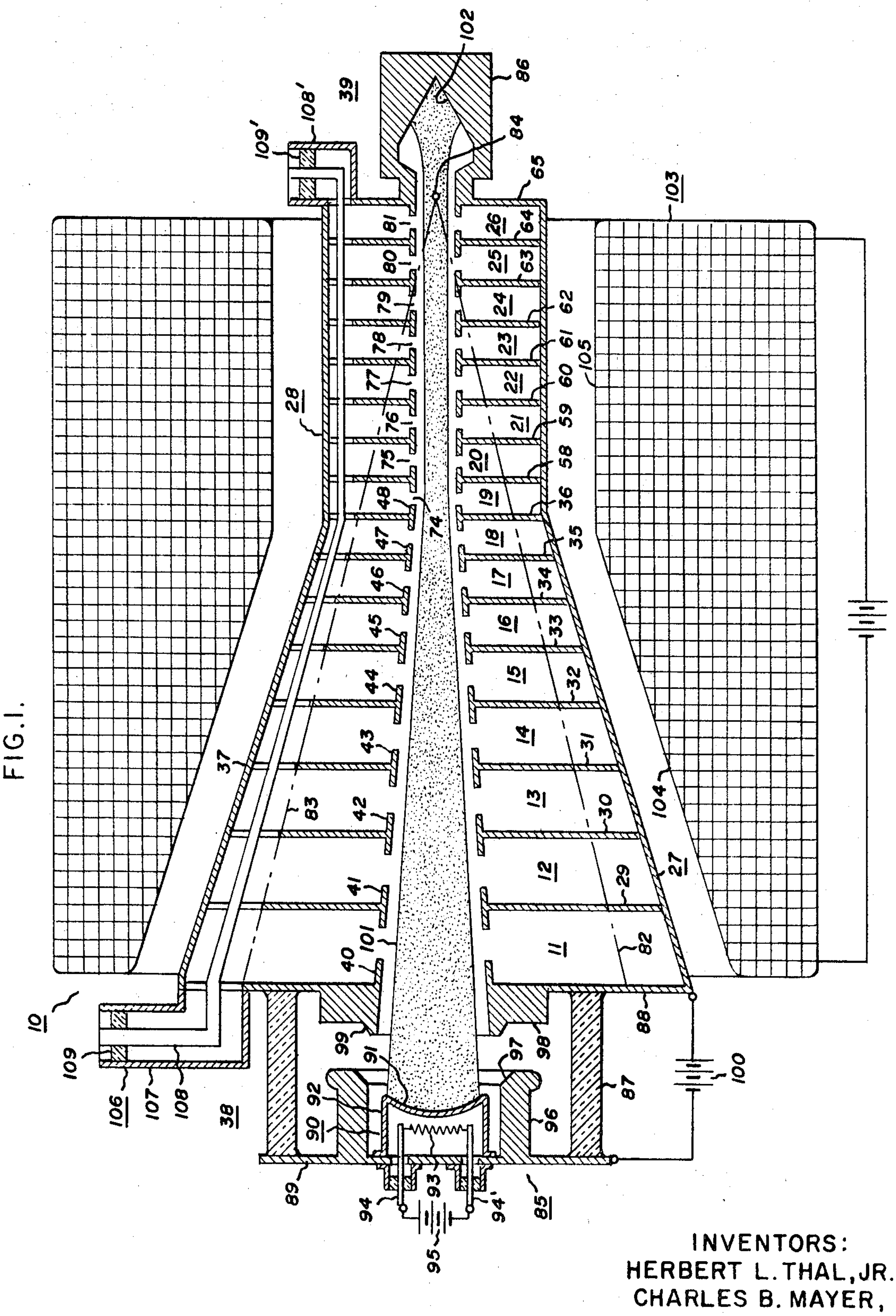

It has been discovered that a log periodic principle may be applied to interaction circuits particularly of the biconical type of R-F power amplification for wide band applications. In this invention "log periodic" or "log periodic manner" are terms applicable to an array of interaction circuits, elements, or regions which are dimensioned and positioned such that electrical properties, e.g., impedance, at each element region et cetera repeat periodically with the logarithm of an operating frequency, e.g., input signal frequency.

Briefly described, this invention in one of its preferred forms, comprises a pair of slow wave interaction circuits whose interaction characteristics therealong vary progressively in a log periodic manner. These circuits are assembled in a structure in axial cooperative opposed relationship defining an electron beam path therethrough. An electron beam, whose effective interaction characteristics, in combination with the interaction structure, vary therealong progressively in a log periodic manner, is caused to pass through the interaction structure in a manner such that the beam and circuit variances occur in the same direction in each circuit. More specifically, in one preferred embodiment of this invention a pair of frustoconical traveling wave-type circuits with successive regions of geometrically progressively decreasing magnitude are positioned in axial abutting apex relationship to interact with a tapering electron beam passing therethrough. An input signal is coupled into one of said circuits to selectively energize a region therein based on the input signal frequency and the beam is modulated. This modulated beam passes into the other of said circuits to selectively energize a region therein and amplified power is transferred to said circuit to be taken off as amplified power out.

In copending applications Ser. Nos. 582,895, Thal and 582,879, Wilbur, filed concurrently herewith and assigned to the same assignee as the present invention, there is disclosed an electron beam device having the log periodic or geometric progression applied to various interaction structures in preferred embodiments. The teachings of the foregoing applications are incorporated herewith.

Accordingly, "log periodic" is a term applied to either the interaction structure, the electron beam, or both, whose defined characteristics therealong vary periodically in geometric progression. The variance is predicated to a large extent on dimensions. For example, in an extended array of klystron type resonant cavities, each cavity is preferably an exact duplicate of its preceding cavity with the exception that significant dimensions of all parts are reduced or increased as the case may be. In this respect the drift tubes also become progressively smaller between adjacent cavities both in diameter and length, and the combined overall reduction provides geometrical axial reductions of successive interaction gaps. In a slow wave circuit utilizing a helix, which is a special case of a periodically interacting structure, for example, successive sections or regions are progressively reduced in diameter while turn density increases. The thickness of the wire lateral dimension may also progressively decrease. In combination the electron beam in either instance tapers or decreases in cross section along the interaction structure in the same direction, i.e., in complementary taper relationship.

Referring now to FIG. 1, there is illustrated the log periodic principle of this invention as incorporated in a klystron type amplifier 10, which is more fully described in the referred to copending applications. Klystron type amplifier 10 includes a slow wave interaction circuit comprising an extended array of a number of adjacent coupled coaxial cylindrical resonant cavities 11 through 26 distributed between an illustrated tapered section 27 having cavities 11 through 18 therein, and an illustrated cylindrical section 28 having cavities 19 through 26 therein. The extended array of cavities of this invention in the tapered section 27 is based upon or embodies a logarithmic progression which provides each succeeding cavity with geometrically progressively decreasing operating characteristics with respect to its resonance. In one form of this invention the logarithmic periodicity and geometric progression is applied, in one sense, with each adjacent cavity being essentially a duplicate in all respects with a preceding cavity with the exception of being smaller in significant dimensions by a constant factor which may be denoted as $\rho$. This logarithmic periodicity with geometric progression is preferably extended over a substantial number of adjacent cavities in the klystron type amplifier 10 and preferably in excess of about three cavities. The logarithmic factor $\rho$ as applied to a cavity diameter for example, would include a first cavity having a diameter of for example 1.0 with the next succeeding cavity having the same position diameter of 0.9, and the next succeeding cavity of 0.81 et cetera. Accordingly, the geometric progression or the log factor $\rho$ in such an instance is defined as 0.9 or alternately as a continuous 10% decrease along the array. The same factor is applied to all significant dimensions of the cavities in the geometric series.

One form of defined interaction circuit in accordance with the log periodic principle includes each cavity 11 through 18 of the log periodic interaction structure having common or partition walls 29 through 36 of decreasing diameter with respect to the defining side or bounding wall 37. By reason of the decreasing diameters of the partition walls and the axial distance therebetween, the side wall 37 takes on, as a surface of revolution, a conical or tapering or frustoconical configuration. This taper, exaggerated in FIG. 1 for the purpose of clarity, includes tapering from a larger diameter at the input end 38 of the klystron type amplifier 10 to a smaller diameter in a direction toward the output end 39 of the klystron type amplifier 10. Each succeeding cavity may be smaller than a preceding cavity in stepwise progression so that a series of short cylindrical bounding wall 37 sections approximate the smooth taper in the same manner as a number of short straight lines may define a curve or circle. The noted approximation is related to configuration only since the step progression is a geometric progression.

The geometric progression also includes adjacent cavities whose density or number of cavities per unit length of interaction structure increases from the input end 38 toward the output end 39. For example, the axial dimension between adjacent cavity partition walls also decreases in a direction from the input end 38 to the output end 39. The axial distance between adjacent walls 30 and 31 for example is less than the corresponding distance between walls 29 and 30.

Cavities 11 through 18 also include as a part of their cavity construction, short tubular transverse wall sections 40 through 48 which are defined as reentrant or klystron-like drift tubes. Each of these reentrant tubes is spaced from preceding and succeeding reentrant tubes to provide well known klystron type interaction gaps 49 through 56. Reentrant tubes 40 through 48 are formed as short frustoconical sections to define a longitudinal tapering channel or electron beam path 57 whose taper follows the log periodic principle as described for the cavities 11 through 18. However, the reentrant tubes may be short cylindrical sections of decreasing diameters in geometric progression to approximate the taper. The interaction gaps 49 through 56 which are defined between adjacent reentrant tube sections are also involved in the geometric progression principle in that their axial spacings also decrease from the input end of the tube 38 toward the output end 39 of the tube 10. These gaps decrease and become smaller in geometric progression in the same manner as the cavities become smaller.

The device 10 may be terminated by a smooth tapering frustrum or apex section having no cavities therein, or a number of identical cavities with the exception of diameters. A preferred method of termination includes a short cylindrical section 28 having a number of succeeding equal cavities therein not embodying the geometric progression. For example, section 28 includes a plurality of cavity resonators 19 through 26 all of which are similar in all respects in that their partition walls 58 through 65, drift tubes 66 through 73, and interaction gaps 74 through 81, et cetera, are all equal to one another.

When traversed by an electron beam the log periodic circuit may have a suitable input power signal applied thereto. A particular axial region or one or more adjacent cavities become responsive to the input signal depending on the frequency of the input signal and interaction takes place in this region to couple power to the beam. At an adjacent region towards the collector end, one or more cavities become receptive to the changed condition of the beam and amplified power is transferred to the cavities for coupling out of the device.

Figure 2:
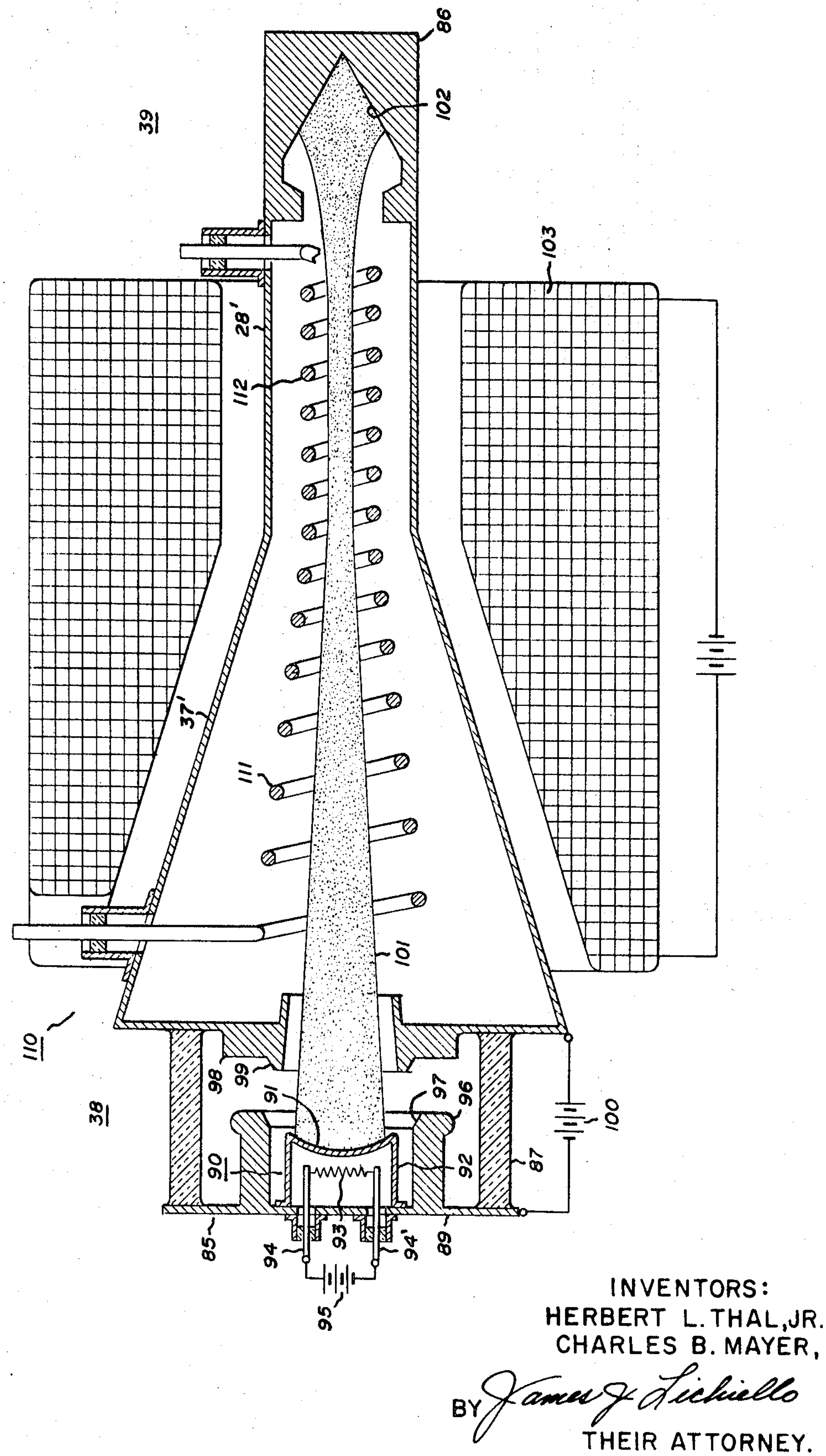
FIG. 2 is another exemplary illustration of another preferred traveling wave log periodic circuit.

The foregoing description relates to one embodiment of a log periodic structure of the coupled cavity or klystron type as more fully described in the mentioned copending applications. The log periodic principle is equally applicable to other circuits and including helix, interdigital, bifilar, magnetron, and other traveling wave types. For example, in FIG. 2 there is illustrated a traveling wave tube modification 110, of the embodiment of FIG. 1, as also more fully described in the mentioned copending applications. In FIG. 2, a suitable envelope structure 37' contains a helix type traveling wave circuit 111. Helix circuit 111 incorporates the log periodic and geometric principle by having a turn density, i.e., the number of turns per unit axial length, increasing from input or cathode end to output or collector end. At the same time the diameter of the helix becomes successively smaller towards the collector end. The log periodic principle may be more completely incorporated in the helix 111 by having both the thickness and width of the helix decrease towards the output end. A termination 28' of helix 111 is provided in accordance with the principles described for termination 28 of FIG. 1. More particularly, a short cylindrical extension 112 of constant helix is provided at the end of tapered helix 111 to extend to the point of projected apex of helix 111.

Figure 3:
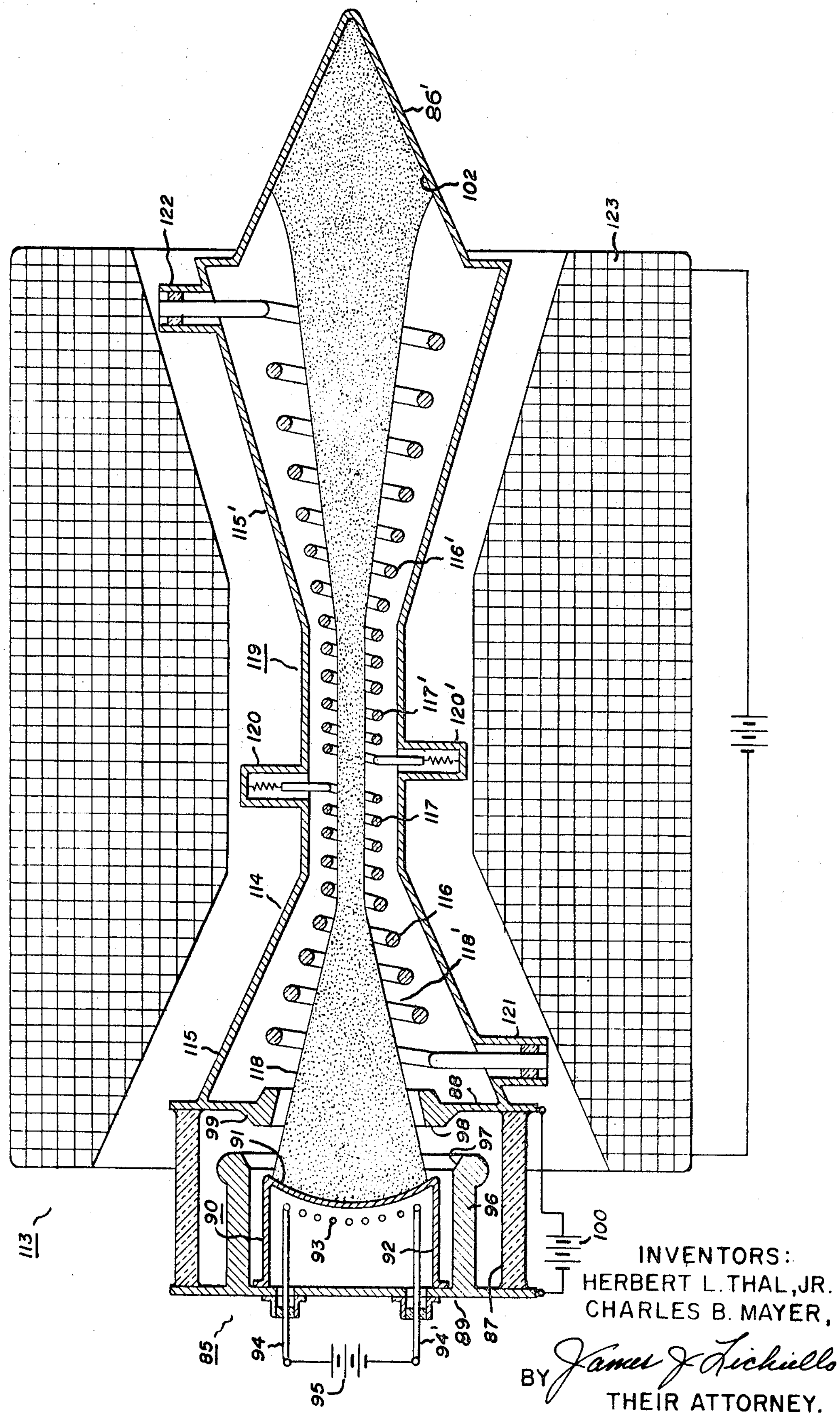
FIG. 3 is an illustration of a combination log periodic circuit of this invention utilizing a pair of helix type circuits.

The present invention comprises a biconical device which incorporates a pair of log periodic circuits such as those illustrated in FIGS. 1 and 2 placed in axial adjacent relationship preferably with their higher frequency ends interconnected in abutting cooperative relationship. Such a device may be referred to as a biconical device because of the usual frustoconical configuration taken by each log periodic circuit. One form of a biconical amplifier device is illustrated in FIG. 3. Referring now to FIG. 3, biconical device 113 includes an envelope structure 114 containing a pair of log periodic sections 115 and 115'. Each section 115 and 115' includes a form of log periodic circuit which may be a slow wave circuit, such as, coupled cavity or helix types, or a magnetron circuit such as interdigital or bifilar types. In the disclosed embodiment each section 115 and 115' includes a similar type interaction circuit in the form of helix circuits 116 and 116', which in turn are similar to the helix 111 of FIG. 2 or the coupled cavity circuit of FIG. 1 for design and function in accordance with the log periodic principle. Circuits 116 and 116' are frustoconical in configuration and each is provided with a termination structure 117 and 117' similar to structure 112 as described for FIG. 2.

The helix circuits 116 and 116' are arranged in axial abutting relationship with their termination structures interconnected in adjacent relationship to define an axial electron beam path 118 extending therethrough. Envelope structure 114 includes an intermediate cylindrical termination portion 119 which houses the interaction terminations 117 and 117'. Where the envelope form follows the contour of the helix circuits 116 and 116' the configuration becomes one of a pair of frustoconical sections with their smaller ends in opposed abutting relationship and interconnected by a narrow, cylindrical section, i.e., 119. By the same token helix circuits 116 and 116' are frustoconical and are arranged with their smaller or high frequency ends in axial facing relationship with the cylindrical section 119 therebetween. Cylindrical section 119 includes each termination 117 and 117' as attached to their respective circuits 116 and 116' respectively, and the combination serves as interconnection means between the two log periodic helix sections 116 and 116'. Interconnection means may be defined as being more specifically related to the circuit elements of this invention. As employed in this specification and claims, the term interconnected or interconnection means defines a continuous electron beam path through the device to cooperatively and functionally connect the circuit sections in a singular device. The circuit elements themselves, e.g., the helix of FIG. 3, need not be a separate pair of helices but could, as known in the art, be a single helix with suitable electrical isolation at the sever section. The interconnecting means as applied to the circuit sections would be a termination section of either or both log periodic sections interconnecting these sections. The interconnection means is the transition from one log periodic section to another and the transition may or may not include a further circuit portion. The beam path 118 is also defined as a pair of frustoconical path sections in axial apex to apex relationship with an intermediate path section 119 which is generally cylindrical.

The design of the biconical device is extremely flexible depending on the final application. Therefore each circuit need not be the same for each section 115 or 115' but may include different types of circuits as well as circuits whose significant dimensions, axial length for example, log periodic factor, et cetera, may differ. More particularly for example, one of the circuits may be of the coupled cavity kind while the other may be a helix. Where one of the circuits is of the coupled or interdigital kind the individual cavities may be alternately connected singly or in plural form to a pair of transmission lines. By the same token, however, individual sections of other circuits may be alternately connected to a pair of transmission lines.

Each of the helix circuits 116 and 116' is provided with a well known sever 120 and 120' at their adjacent ends for electrical isolation of the circuits. Circuit 116 is provided with an input coupler 121 at its other end and serves as the input circuit for biconical device 113. Circuit 116' is provided with an output coupler 122 at its other end and serves as the output circuit for biconical device 113.

In order to provide an electron beam 118 passing through electron beam path 118', an electron gun structure 85 similar to those of FIGS. 1 and 2 is utilized at the input end of device 113, and a corresponding electron collector 97', as well known in the art, is utilized at the opposite or output end of device 113. Electron gun structure 85 is exemplary of a number of suitable gun structures including for example the gun structure as disclosed in U.S. Pat. 3,046,442, Cook. See also J. R. Pierce, "Theory and Design of Electron Beams," Nostrand Co., Inc., New York, N.Y., 1949. In FIG. 1, electron gun structure 85 includes a cylindrical electrically insulating section 87 which is mounted concentrically on the end wall 88 of envelope 114 and also concentric to the electron beam path 118. A transverse wall 89 is attached to section 87 to support the electron gun emitter 90 therein. Electron gun emitter 90 as known in the art includes an electron emissive surface usually including a combination of a barium compound and a refractory metal matrix. This surface which is denoted as surface 91 in FIG. 3 is of a concave design ordinarily as large as or larger than the beam path 118 and is suitably supported by wall 92 from the transverse wall 89. A filamentary type electrical heater element 93 is suitably positioned adjacent concave surface member 91 to raise the temperature thereof for copious electron emission. Filamentary heater 93 includes electrical elements 94 and 94' which project through wall 89 in an insulating electrical relationship and are connected to a suitable source of power such as for example battery 95.

An electrical shroud or forming structure 96 having an outwardly flared lip 97 thereon circumferentially surrounds the concave emissive surface member 91 and is electrically connected to the transverse wall 89. An annular block member 98 having a flared lip 99 thereon defines the entry portion of the electron beam path 118 and is positioned concentrically thereto and concentrically with the structure of electron gun emitter 90. These structure 96 and 98, and their adjacent flared surfaces 97 and 99, are so formed so that the electrical field existing therebetween exerts a controlling influence on the electron beam to control the beam shape as it enters path 118.

The collector 86', as well as the remaining interim parts of the device 113 are electrically conductive so that transverse wall 89 is connected to the negative side of a suitable source of power, such as battery 100 while the helix structure and the collector 97' are connected to the positive side of the battery 100. Electrons are therefore emitted from surface 91 and are suitably formed by shroud 96 and annular block 98 and the electrical field therebetween as an electron beam 118 to pass down the electron beam path 118' and to be collected by the collector 86'. A solenoid coil 123 having suitable variations of turn density, taper, et cetera, provides a tapering electron beam in each section 115 and 115'. Collector 86' may be a suitable block member defining an electron collecting cavity or cavity surface 102 therein, and may also have suitable cooling means associated therewith as known in the art.

It is an important feature of this embodiment or this invention that each circuit 116 and 116' be terminated by a short cylindrical termination 117 and 117' respectively. These terminations 117 and 117' are preferably free from the log periodic factor, but may have a modified log periodic factor applied thereto in part. Terminations 117 and 117′ provide more effective interaction at higher frequencies.

It is also a feature of a preferred form of this invention that the apices of each log periodic circuit, when in a generally tapered or conical form, are essentially coincident, or that each circuit shares a common projected apex which lies between the two cylindrical terminations 117 and 117′. The two cylindrical terminations 117 and 117′ may be described as a length of circuit between the pair of log periodic circuits. The total length of this termination or drift section 119 should be generally equal to the truncated length of the two conical sections it replaces. In other embodiments of this invention the apices may be spaced apart within limitations to provide better operating characteristics for different applications. Severs 120 and 120′ provide for isolation at the plane of the common apex. Since each conical portion of the amplifier is a log periodic structure, the sever at this plane does not introduce any significant frequency sensitivity.

In the operation of the device 115 of FIG. 3 an input signal is coupled to the helix circuit 116 by means of input coupler 121. Depending on the frequency of this signal a region or portion of the axial length of the helix 116 becomes effectively responsive to the signal and interaction between the electron beam and circuit 116 takes place at this defined region, and power is coupled to the beam in the input circuit 115 in the known helix circuit traveling wave tube manner. The amplified signal then passes along the beam into the output circuit 116′ where it selectively energizes a region or portion of the circunit (depending on the frequency of the input signal) and transmits amplified power to the circuit 116″. Power out is coupled from output connector 122.

Figure 4:
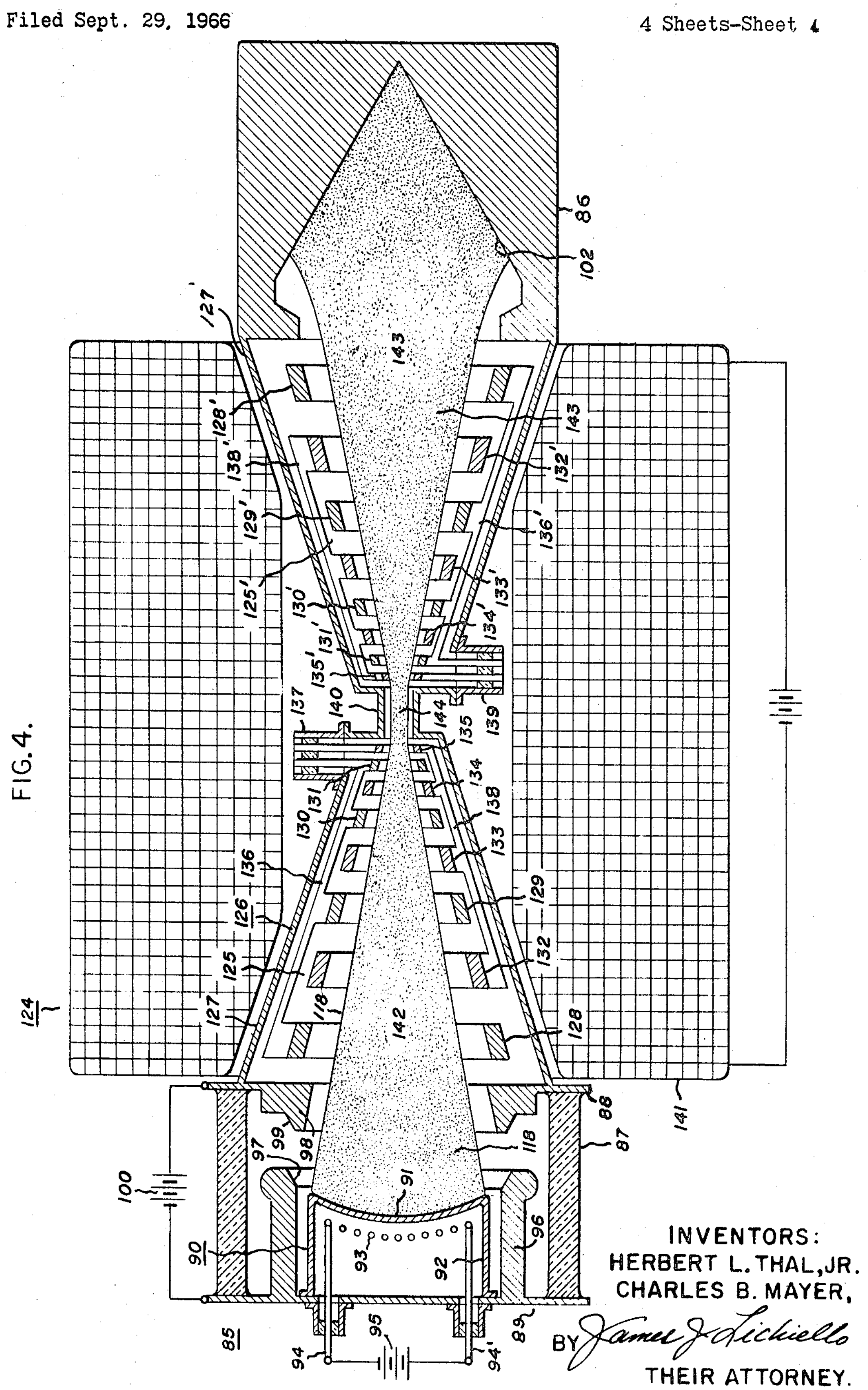
FIG. 4 is an illustration of another combination log periodic circuit of this invention utilizing a pair of interdigital circuits.

A modification of this invention is illustrated in FIG. 4 as a log periodic amplifier 124. Amplifier 124 differs from amplifier 113 of FIG. 3 primarily in the use of an interdigital type log periodic circuit. In FIG. 4 a pair of tapered log periodic interaction circuits 125 and 125′ are contained in a suitable envelop 126. Since in this example circuits 125 and 125′ are each of a frustoconical configuration envelope 126 comprises a pair of frustoconical sections 127 and 127′ to contain circuits 125 and 125′ respectively in complementary taper relationship.

Each of the circuits 125 and 125′ are similar in this example so that at description of one suffices for the other. Circuit 125 comprises a spaced axial array of interdigital members 128, 129, 130, 131, and alternate members 132, 133, 134, and 135. These members may be of a number of configuations including for example fingers, discs, apertured plates, rings, cylinders, et cetera. In FIG. 4 the interdigital members are of annular configuration such as short cylindrical sections. Interdigital members 128, 129, 130, and 131, are suitably joined to a transmission line 136 leading to input coupler 137 at the smaller end of circuit 125. Interdigital members 132, 133, 134, and 135 alternate with the aforementioned interdigital members but are connected to a separate transmission line 138 which also leads to input coupler 137. The use of a pair of opposite transmission lines 136 and 138 for the connnection of alternate interdigital members is referred to as a balanced two condition transmission line. Circuit 125 is accordingly designated as the input circuit for amplifier 124. Circuit 125′ with counterpart interdigital members, transmission lines, and output coupler 139 is designated the output circuit for amplifier 124. The interdigital circuits of the type shown as 125 and 125′ are usually operated in the frequency region where the electromagnetic waves propagate in the backward wave mode, i.e., where the phase velocity and group velocity have opposite signs, e.g., positive and negative.

Envelope 126 includes an intermediate or drift section 140 which axially spaces opposed envelope sections 127 and 127′. More particularly, drift section 140 spaces interconnects circuits 125 and 125′ so that their ordinarily tapering projections meet in a common apex in drift section 140. The axially spaced distance between circuits 125 and 126′ is no more than the combined lengths of the conical portions giving rise to the frustoconical configuration, i.e., the conical portions which would need to be added to the frustrum circuits to have them be right circular cones. As before described, other modifications may employ spaced apart apices.

In FIG. 4 a gun structure 89, similar to those of FIGS. 1, 2, and 3, is provided at the input circuit 125 end of amplifier 124 and a collector 86 at the other end. As electron beam 118 is generated by gun structure 85 to pass through input circuit 125, drift section 140 and output circuit 125′, to collector 86. A varying field, turn density taper, solenoid 141 or other suitable beam control means is provided to provide a beam portion 142 in circuit 125 which is also frustoconical and in complementary taper relationship therein. Solenoid 141 also provides, in oppositely directed circuit 125′, a beam portion 143 which is also frustoconical and in complementary taper relationship therein. That portion 144 of the beam passing through drift section 140 does not have a critical configuration. It is conveniently and preferably of a generally cylindrical configuration although its outer defined shell may be inwardly bulged.

FIG. 4 is illustrated as a backward wave amplifier, although by having the transmission lines 136 and 138 connecting at their other ends to a coupler at the larger end of the circuits, instead of connections at the small end of the circuits, the amplifier may be operated as a forward wave device. In either device operation is generally similar in that an input signal is impressed between transmission lines 136 and 138. This signal passes through circuit 125 towards the electron gun 85 or cathode end of amplifier 124 until a region of interdigital circuit is reached which is responsive to the frequency of the input signal, i.e., where the phase velocity of the wave on the circuit is essentially synchronous with the velocity of the electron beam. In this region strong interaction takes place between the beam and the circuit and power is coupled to the beam in the form of velocity modulation. The beam then passes through drift section 140 where beam bunching and R-F amplification occurs and into output circuit 125′ until a region is reached where the bunched beam again becomes synchronous with the circuit phase velocity and interacts with a region of the output circuit to couple amplifier R-F power into the circuit to be taken out at coupler 139.

The axial position of the active or responding region in the input circuit 125 in which interaction takes place is dependent on the input signal frequency and the region moves axially reversibly along the beam in conformance to input signal frequency variations. The region in the output section in which interaction takes place is dependent on the position of the counterpart region in the input circuit and consequently on the input signal frequency. The output region on the peak point thereof is fixedly related to the peak point of the interacting region of the input circuit, and moves reversibly along the output circuit in unison and equidistantly with the interacting region of the input circuit.

In the foregoing exemplary applications the electron beam is subject to some modulation whether velocity, density, or combination thereof. The invention is broadly applicable to beam devices where the beam passing through a log periodic circuit provides significant changes in an input signal and power output may be changed such as by being amplified or provided with desired oscillations. As well known in the art, these devices may also act as frequency converters, rectifiers, variable conductor, et cetera.

This invention thus describes the specific combination of a log periodic interaction circuit whether of the coupled cavity resonator type, magnetron or vane type, helix type, or other known circuits, together with a log periodic electron beam passing through the device, where the beam effective interaction characteristics vary axially therealong in a log poriodic manner. In the operation of such a device the input frequency predeterminedly selects its own cavity or cavities or region of a helix or other interaction structure for interaction. The location or position of the actual cavity or section of an interaction circuit energized may change or move along the interaction circuit reversibly dependent on input signal frequency. This may be described as a floating region along the interaction structure transiently localized by the particular frequency of the input signal.

The floating region may encompass one or more successive cavities of FIG. 1, a portion of the helix of FIG. 2, or successive interdigital rings of FIG. 4. In a resonant cavity device a given signal will provide effective response of one or more cavities for interaction energy exchange while other adjacent cavities may be only slightly or negligibly responsive. Where the beam couples power to the circuit a similar region of cavities is defined. These regions may be in effect immediately following each other or they may be spaced apart by cavities of negligible or no response. The peak response of the two regions are spaced apart and their axial spacing is fixedly related to each other as depending on the frequency of the input signal, and both float as above defined. Both regions are adjacent in that no effectively responsive region is apparent therebetween. The operation is similar for traveling wave circuits such as helix circuits, interdigital circuits, et cetera. These latter circuits may be considered to be circuits periodically acting on or with an electron beam where each turn of a helix, or ring of an interdigital circuit is defined as a period.

The log periodic circuit may be adapted for forward or backward wave characteristics, and the log periodic factor is defined as greater or lesser than one depending on which direction the input signal follows. In a reverse structure where the cathode is at the smaller end of the circuit and the beam becomes progressively larger towards the anode end, the log periodic factor is defined as greater than one.

Best results are obtained in this invention when the log factor is applied to the total interaction circuit, not including a terminating section. However, the log factor need not be the same for all circuits or for a single circuit. In an alternate arrangement of cavities, alternate cavities may have different log factors applied. For the invention of FIGS. 4 and 5 for example different axial sections may have different log factors applied thereto. Incremental differences in the log factor for example between 0.90 and 1.0 are significant with respect to operating results. A factor employed in this invention has been 0.925 and one preferred range of factors is from about 0.90 to about 0.95.

The invention as described is also operable as a log periodic antenna of wide range by providing suitable cavities or sections with radiation means as known in the art.

While this invention has been described with reference to particular and exemplary embodiments thereof, it is to be understood that numerous changes can be made by those skilled in the art without actually departing from the invention as disclosed, and it is intended that the appended claims include all such equivalent variations as come within the true spirit and scope of the foregoing disclosure.

What is claimed as new and desired to be secured by Letters Patent of the United States is:

1. A method of operating an electron discharge device comprising (a) passing an electron beam through a first log periodic circuit section with the interaction characteristics of said beam and said circuit section varying in a log periodic manner in the same direction, (b) impressing an input signal on said first circuit section for selective interaction of a region of said circuit and modulation of said beam, (c) passing said modulated electron beam through a second log periodic circuit section with the interaction characteristics of said modulated beam and said circuit section varying in a log periodic manner in the same direction but opposite to the said first circuit for transferring power to said second circuit, and (d) coupling a changed power output signal of said second circuit section, 2. A log periodic amplifier comprising in combination (a) a pair of log periodic circuits each having electron beam interaction characteristics which vary in frequency response towards one end thereof in a log periodic manner, (b) interconnecting means positioning the higher frequency ends of said circuits in axial adjacent relationship, (c) said circuits defining an electron beam path therethrough, (d) means to generate an electron beam passing through said circuits, (e) means to control the cross section of said beam in said circuits so that axial increments of said beam in said circuit vary in a log periodic manner complementary with said log periodic variation in said circuits, (f) means to provide an input signal into said input circuit for interaction with a region of said circuit selected by the frequency of said input signal, (g) means to couple power out of said output circuit from a region thereof selectively energized by the interaction region of said input circuit and fixedly related thereto, (h) and electron collector means to collect electrons from said electron beam after said interaction takes place.

3. A log periodic amplifier comprising in combination (a) a pair of tapered log periodic interaction circuits having larger and smaller ends, (b) interconnecting means positioning said circuits with their small ends in axial adjacent relationship, (c) said circuits defining a tapered electron beam path therethrough in each said circuit, (d) electron emission means at one end of said amplifier to generate an electron beam passing through said circuits, (e) electron beam control means to provide tapering of said electron beam passing through said tapered path in each of said circuits in complementary taper relationship for beam interaction with said circuits, (f) power input signal means coupled to one of said circuits, and (g) power output means coupled to the other of said circuits, (h) and electron collector means operatively associated with one end of said circuits to collect electrons from said electron beam passing therethrough.

4. The invention as recited in claim 3 wherein said electrically tapered circuits include frustoconical structures joined at their smaller ends.

5. The invention as recited in claim 3 wherein said interconnecting means includes a cylindrical intermediate structure.

6. The invention as recited in claim 3 wherein one of said circuits includes a slow wave circuit.

7. The invention as recited in claim 3 wherein one of said circuits includes an axially extended array of reentrant cavity resonators for selected interaction.

8. The invention as recited in claim 3 wherein one of said circuits includes a traveling wave helix interaction circuit.

9. The invention as recited in claim 3 wherein one of said circuits includes an interdigital circuit.

10. The invention as recited in claim 3 wherein both circuits each include an axially extended array of reentrant cavity resonators.

11. The invention as recited in claim 3 wherein both of said circuits each include a traveling wave tube helix interaction circuit.

12. The invention as recited in claim 3 wherein both of said circuits include interdigital circuits.

13. The invention as recited in claim 3 wherein said interconnecting means comprises a drift tube section of significantly reduced interaction characteristics for each of said circuits.

14. The invention as recited in claim 3 wherein said interconnecting means comprises a sever section of interaction circuit for each of said interaction circuits.

15. The invention as recited in claim 14 wherein said sever section includes a section of circuit of constant interaction characteristics.

16. The invention as recited in claim 14 wherein said sever section provides a common intersection point for the taper of each of said sections.

17. The invention as recited in claim 3 wherein said circuits are frustoconical with a common projected apex.

18. The invention as recited in claim 3 wherein said amplifier is a forward wave structure.

19. The invention as recited in claim 3 wherein said amplifier is a backward wave structure.

20. A log periodic amplifier comprising in combination (a) a pair of log periodic interaction circuits of frustoconical configuration defining a frustoconical electron beam path axially therethrough, (b) a drift section of significantly reduced interaction characteristics operatively joining said circuits for passage of an electron beam therethrough, (c) said drift section interconnecting said frustoconical circutis in small end adjacent relationship with a common projected apex, (d) electron emitter and control means to generate a frustoconical electron beam passing through each of said circuits in complementary taper relationship for interaction therein, (e) means to provide an input signal into said input cricuit for interaction with a region of said circuit selected by the frequency of said input signal, (f) means to couple power out of said output circuit from a region thereof selectively energized by the interaction region of said input circuit and fixedly related thereto, (g) and an electron collector on one end of one of said circuits to collect electrons from said beam passing from said circuit.

References Cited

"Log-Periodic Transmission Line Circuits—Part I: One-Port Circuits," by Du Hamel et al.; IEEE Tranactions on Microwave Theory and Techniques, vol. MTT-14, No. 6, June 1966, pp. 264–274 relied upon.

RODNEY D. BENNETT, Primary Examiner

DANIEL C. KAUFMAN, Assistant Examiner

U.S. Cl. X.R.

315—5.43, 39.5; 330—43